United States Patent [19]

Walker

[11] Patent Number: 4,654,202
[45] Date of Patent: Mar. 31, 1987

[54] SEPARATION OF HYDROGEN SULFIDE FROM GASES BY THE USE OF CUPROUS ALUMINUM TETRACHLORIDE AS A REVERSIBLE COMPLEXING REAGENT

[76] Inventor: David G. Walker, 904 Fleetwood Dr., Baytown, Tex. 77520

[21] Appl. No.: 682,682

[22] Filed: Dec. 17, 1984

Related U.S. Application Data

[63] Continuation-in-part of Ser. No. 569,574, Jan. 9, 1984, abandoned.

[51] Int. Cl.$^4$ .............................................. B01D 53/34
[52] U.S. Cl. .................................... 423/220; 423/463; 423/467
[58] Field of Search ............... 423/210, 220, 226, 230, 423/463, 467

[56] References Cited

U.S. PATENT DOCUMENTS 3,754,047 8/1973 Long et al. ........................... 585/848
3,927,176 12/1975 Turnbo et al. .................. 423/210 R
4,141,960 2/1979 Long et al. ........................... 423/417

Primary Examiner—John Doll
Assistant Examiner—Jeffrey E. Russel

[57] ABSTRACT $H_2S:CuAlCl_4$ and $2 H_2S:CuAlCl_4$ are complex addition compounds which may be prepared by contacting $CuAlCl_4$ with gaseous $H_2S$ at partial pressures of 0.1 to 1.0 atma and temperatures of 20°-60° C. These new compounds are useful in processes to separate hydrogen sulfide from gaseous mixtures and to prepare pure hydrogen sulfide. Complexation can be accomplished by using $CuAlCl_4$ in the solid state, in solution or in a slurry. $H_2S$ is recovered by subjecting the complex addition compounds to some combination of temperature and hydrogen sulfide partial pressure as to break up the complexes and to evolve the hydrogen sulfide content of the complex as a gas stream.

3 Claims, 1 Drawing Figure

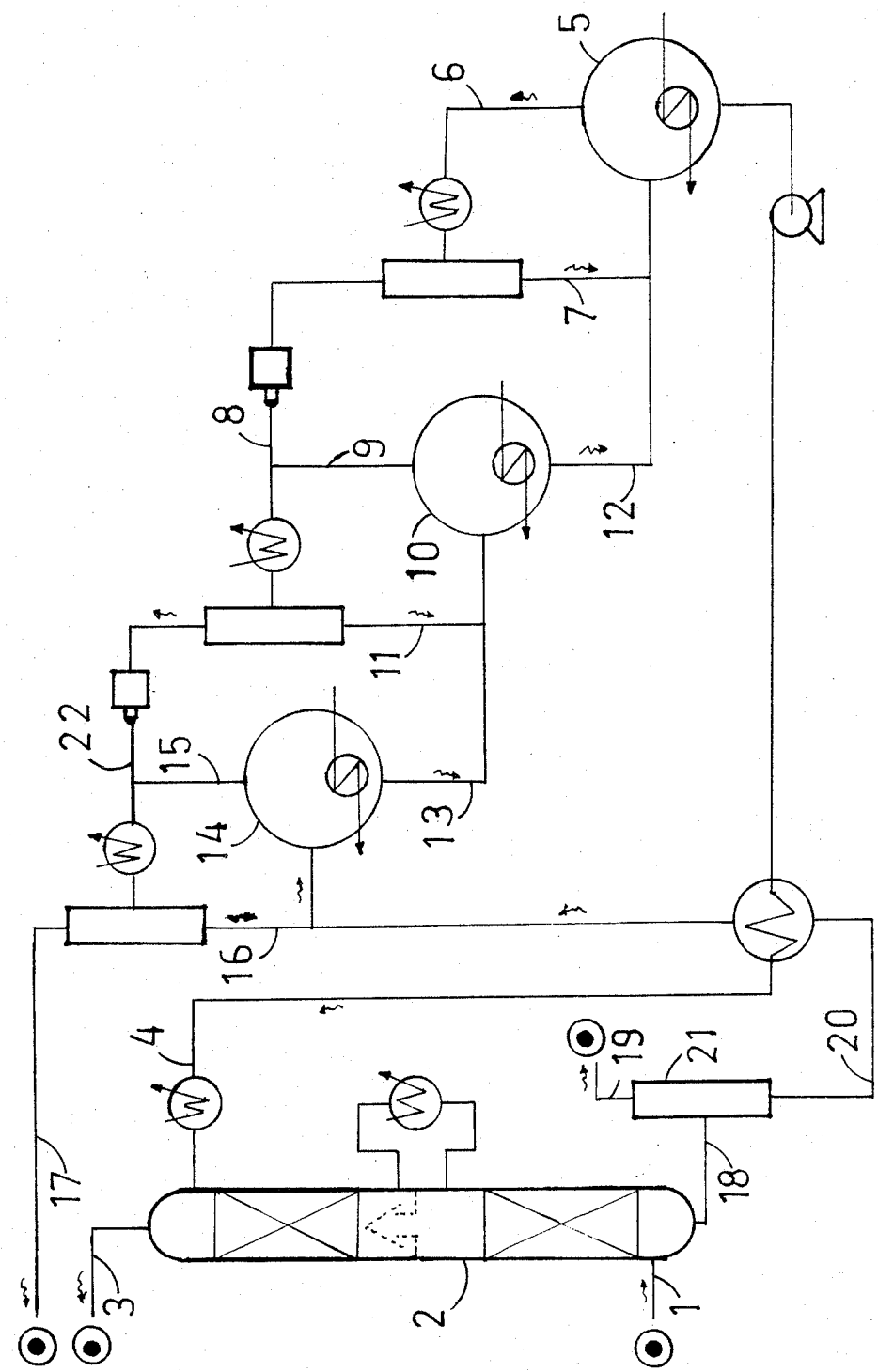

SEPARATION OF HYDROGEN SULFIDE FROM GASES BY THE USE OF CUPROUS ALUMINUM TETRACHLORIDE AS A REVERSIBLE COMPLEXING REAGENT

This is a continuation-in-part of application Ser. No. 06/569,574, Filed Jan. 9, 1984 now abandoned.

Hydrogen sulfide is commonly separated from gases by reversible reaction with some amine in an aqueous solution. Amines in use include moneethanolamine, diethanolamine, methyl diethanolamine and diglycolamine. Carbon dioxide is commonly found in gases associated with hydrogen sulfide. The difference in equilibrium solubilities of $H_2S$ and $CO_2$ in any aqueous amine solution is not great. Commonly, when $H_2S$ is removed from gases to sweeten them nearly all of the $CO_2$ present is also removed and produced with the $H_2S$ product. Sometimes $H_2S$ needs to be removed from $CO_2$ itself. In this case resort must be made to chemical reagents or to some solid reaction-absorbant like iron oxide. $CO_2$ if present has bad effects on the common use of $H_2S$ which is to react it in a Claus plant to elemental sulfur. $CO_2$ in a Claus plant is a source of COS which causes higher than desirable sulfur emissions from the Claus plant and makes a more complicated expensive plant necessary. It would be greatly desirable for a separation solvent to have a high solubility of $H_2S$ but to have a negligibly small solubility of $CO_2$.

$CuAlCl_4$ AND ITS PRIOR ART

Cuprous Aluminum Tetrachloride has been previously patented as a bimetallic salt useful in the complexing and the separation of olefins, acetylenes, carbon monoxide and aromatic compounds (examples: U.S. Pat. No. 4,141,960 and U.S. Pat. No. 3,754,047). The claims for these patents restrict its use to the above mentioned class of compounds.

No mention of using this compound to complex and separate ligands of other types has been found by this inventor in a reversible manner. Turnbo et al, U.S. Pat. No. 3,927,176 patented the removal of water from gas streams by the use of $CuAlCl_4$. He knew and taught that the water was removed by irreversible reaction to destroy mol per mol the $CuAlCl_4$. The end products of this irreversible reaction with water are cuprous chloride solid, aluminum oxychloride and hydrogen chloride. He mentioned that $H_2S$ could be removed in a like manner from gases. He obviously believed and expected reactions:

$H_2S + CuAlCl_4 \rightarrow $ 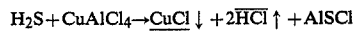 $ + 2\overline{HCl} \uparrow + AlSCl$ and $H_2S + 2CuAlCl_4 \rightarrow $ 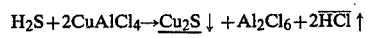 $ + Al_2Cl_6 + 2\overline{HCl} \uparrow$ to occur and to be important He obviously expects $H_2S$ to be removed from gases only irreversibly and with the sacrifice of mol/mol of solvent just as is true with water.

No experimental data are found in the literature to expect that $H_2S$ has a high solubility in solutions containing $CuAlCl_4$ nor that any stable reversible addition compounds between these two molecules would exist.

SUMMARY OF THE INVENTION

It has been found that hydrogen sulfide forms two addition compounds with $CuAlCl_4$. These complex addition compounds are formed at subatmospheric partial pressures of $H_2S$ in the temperature range 30° to 60° C. The formation of these addition compounds is perfectly reversible by applying vacuum and/or heat to the addition compounds. Side reactions like those written in $CuAlCl_4$ and Its Prior Art are negligible. $H_2S$ may be quantitatively absorbed in aromatic solutions of $CuAlCl_4$ and quantitatively recovered even after many days standing of the solutions. The aromatic solutions containing absorbed $H_2S$ are heated to a high temperature while maintaining the material at a sufficiently low pressure so that the partial pressure of the mixture is higher than the equilibrium pressure to evolve $H_2S$ and regenerate $CuAlCl_4$ in the aromatic solution.

EXPERIMENTAL

Having now described the invention, the following four experiments will serve to illustrate the preparation and the use of $CuAlCl_4$ in the separation of $H_2S$ and production as a pure compound from gases.

EXAMPLE 1

A $CuAlCl_4$ solution was prepared in toluene by mixing 4.6 mmol of anhydrous aluminum chloride, 11.6 mmol cuprous chloride and 19 mmol of toluene in a dry stirred vessel. The sample was refluxed and stirred at atmospheric pressure for two hours. 2.55 mmol of HCl gas was evolved. The residual sample was largely a liquid solution of $CuAlCl_4$ in toluene. A small solid phase of CuCl was also present.

The sample was contacted with $H_2S$ gas at 20° C. and the amount of $H_2S$ dissolved into the liquid was measured as a function of $H_2S$ partial gas pressure. At an $H_2S$ pressure of 0.143 atma, 9.85 mmol of $H_2S$ was dissolved in the liquid phase. After 3 hours the sample was heated at 100° C. and high vacuum to recover a toluene fraction at −78° C. and an $H_2S$ fraction isolated at −194° C. The recovered $H_2S$ gas fraction measured (P-V measurements) 98±3% of the $H_2S$ which had been added to the sample.

EXAMPLE 2

6.8 mmol of $CuAlCl_4$ in a liquid volume of 2.0 ml was prepared as in example 1. 2 ml was transferred by pipette to a stirred vessel. At 18° C. and an $H_2S$ partial pressure of 0.06 atma, 11 mmol of $H_2S$ was rapidly absorbed into the liquid. The sample was left standing 24 hours. 98% of the $H_2S$ charged was recovered by heating the sample under high vacuum at 100° C.

EXAMPLE 3

The sample of Example 2 was again treated with $H_2S$ and was found to dissolve 1.0 mol of $H_2S$ per mol of $CuAlCl_4$ in toluene at 60° C. and an $H_2S$ gas pressure of 190 mm Hg. At 30° C. the sample was found to dissolve 2.0 mol of $H_2S$ per mol of $CuAlCl_4$ at an $H_2S$ pressure of 160 mm Hg.

These examples show that $CuAlCl_4$ has a large absorption capacity of $H_2S$ at temperatures from 30° to 60° C. and at low $H_2S$ partial pressures. The approach to equilibrium is rapid with vigorous stirring. Side reactions of the absorbed $H_2S$ under the conditions of the experiments must be very small.

EXAMPLE 4

A liquid solution 48 wt. % $CuAlCl_4$ in ortho-chloro biphenyl was prepared by mixing and heating together the proper amounts of the two compounds. The liquid analyzed 2.6 Molar in $CuAlCl_4$. Hydrogen sulfide was added and its equilibrium solubility was measured at various temperatures. The dissolved hydrogen sulfide was found to be quantitatively recovered after heating the liquid solution under high vacuum at 80° to 100° C. Some experimental equilibrium points are listed in Table I

TABLE I

Solubility of $H_2S$ in 2.6 M $CuAlCl_4$ in ortho-chloro biphenyl

| Temperature, °C. | $H_2S$ Pressure in mm Hg. | Dissolved in mols $H_2S/CuAlCl_4$ |
|---|---|---|
| 90 | 260 | 0.75 |
|  | 380 | 0.85 |
|  | 600 | 0.92 |
| 70 | 115 | 0.82 |
|  | 370 | 1.0 |
|  | 460 | 1.15 |
|  | 590 | 1.4 |
| 50 | 58 | 0.83 |
|  | 102 | 0.96 |
|  | 163 | 1.08 |
|  | 314 | 1.18 |
|  | 345 | 1.23 |
|  | 448 | 1.47 |

The data shown in Table I are equilibrium partial pressures of $H_2S$ in the solvent. If the system pressure is greater than the sum of the partial pressure of $H_2S$ in the solvent and the partial pressure of the aromatic component of the solvent, the system is stable. If the system pressure is less than the sum of these partial pressures, a gas evolution will occur until the system pressure is equal to the sum of the partial pressures of the solvent's constituents.

At 20° C. a solid precipitate appeared at a liquid composition 1.6-1.8 mols of $H_2S$ per mol of $CuAlCl_4$. A constant plateau of $H_2S$ pressure of 25 mm Hg was found tetween compositions of $H_2S/CuAlCl_4$ from 1.6 to 1.0. Below 1.0 the system pressure dropped abruptly to less than 8 mm of Hg.

The equilibria points of 90°, 70° and 50° C. are diagnostic of the existance of a one-to-one complex between $H_2S$ and $CuAlCl_4$ and an equilibrium in the liquid phase of:

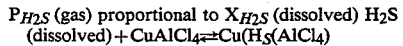

$P_{H_2S}$ (gas) proportional to $X_{H_2S}$ (dissolved) $H_2S$ (dissolved) + $CuAlCl_4 \rightleftharpoons Cu(H_S(AlCl_4)$ The solid which precipitates at 20° C. is $Cu(H_2S)AlCl_4$. This species becomes saturated in the liquid phase as it becomes more concentrated due to $H_2S$ absorption and to the more favorable equilibrium constants at lower temperatures.

The change in slope of the $H_2S$ solubility curves at .50° to 70° C. in the region of concentration $H_2S/CuAlCl_4$ from 1.0 to 1.5 is due to the existance of an additional complex which is $Cu(H_2S)_2AlCl_4$.

$Cu(H_2S)(AlCl_4) + H_2S \rightleftharpoons Cu(H_2S)_2(AlCl_4)$

The equilibria shown above is not important at 90° C. and $H_2S$ pressures below 600 mm Hg. It becomes important at 70° C. and increasingly so as the temperature is further lowered.

PREFERRED EMBODIMENT

The drawing shows an arrangement of apparatus by which $H_2S$ may be separated from gases and recovered quantitatively in good purity by the use of this invention. Further information concerning the drawing is set forth below.

DETAILED DESCRIPTION

A sour gas 1 containing hydrogen sulfide is fed to the bottom of an absorption column 2 which is provided with solvent inter-cooling. Gas rises through the column and transfers $H_2S$ to a down-flowing liquid solvent phase 4($CuAlCl_4$ dissolved in a mixture of mono-chloro biphenyl isomers) such as a mixture of the three mono-chlorobiphenyl isomers. A sweet gas product 3 issues from the absorber overhead.

Fat solvent 18 ($H_2S$ rich) flows from the absorber bottom and enters a flash tank 21 which is at a lower pressure than the absorber 2. A gas stream 19 leaves the flash tank and contains nearly all of the gas compounds like methane, carbon dioxide, carbon oxysulfide present in the original gas along with a small part of the dissolved $H_2S$ in the fat solvent 18. Solvent containing pure $H_2S$ leaves the flash tank 21, is heated in a cross-heat exchanger against lean hot solvent 4 and is then fed to a kettle reboiler 14. Reboiler 14 operates at a temperature of 100°-150° C. and a pressure of 1-2 atma.

Hot vapor 15 from reboiler 14 is mixed with a compressed gas stream 22. These combined vapor streams are cooled to produce a pure $H_2S$ gas 17 and a condensate 16 which is recycled to reboiler 14. The liquid product 13 is fed to kettle reboiler 10. This reboiler operates at 100°-150° C. and a pressure of 0.3-0.7 atma. Hot vapor 9 from reboiler 10 is mixed with a compressed gas 8 from reboiler 5 and cooled to produce a condensate 11 which is fed to reboiler 10 and a gas 22. The liquid product 12 from reboiler 10 is fed to kettle reboiler 5. Reboiler 5 operates at 100°-150° C. and a pressure of 0.1-0.25 atma. The hot vapor 6 from reboiler 5 is cooled to produce a condensate 7, which is recycled to the reboiler, and a gas 8 which is compressed and mixed with the hot vapor product 9 of reboiler 10.

The liquid product 4 of reboiler 5 is lean solvent ($CuAlCl_4$ dissolved in mono-chloro biphenyl isomers which contains only a small amount of $H_2S$). Lean solvent 4 is cross-heat-exchanged with liquid 20 and then cooled on its flow to the top of the absorbed 2.

VARIATION OF THE PREFERRED EMBODIMENT

The flash tank 21 may be sustituted by the following described apparatus. A contacting section is built into the absorber column 2 between the sour gas feed point 1 and the column bottom. A heat exchanger is installed in the column bottom to heat the fat solvent. The proper amount of heat will create a stripping gas flow in the column bottom which will push dissolved gaseous impurities to the column 2 overhead and aid the unit in making a pure $H_2S$ product 17. The $H_2S$ content of the sweet gas 3 is only slightly raised by this method when the heating is properly adjusted.

What is claimed is:

1. A process for the separating and recovering of $H_2S$ from gases containing $H_2S$ which comprises:
   a. contacting the gas with an aromatic solution of $CuAlCl_4$ at a temperature of 30°-90° C. and a subatmospheric partial pressure of hydrogen sulfide such that $H_2S$ is reacted to form compounds of the formula $H_2S:CuAlCl_4$ and $2H_2S:CuAlCl_4$, said aromatic being chosen from toluene, a chlorobiphenyl isomer, or a mixture of chlorobiphenyl isomers;

b. separating the mixture of the aromatic solution of $CuAlCl_4$, $H_2S:CuAlCl_4$ and $2H_2S:CuAlCl_4$ from the gas and then heating the separated mixture to a high temperature while maintaining the material at a sufficiently low pressure so that the partial pressure of the mixture is higher than the equilibrium pressure to evolve $H_2S$ and regenerate $CuAlCl_4$ in the aromatic solution.

2. A process as in claim 1 where the aromatic part of the solution is a monochlorobiphenyl compound.

3. A process as in claim 1 where the aromatic part of the solution is a mixture of the three monochlorobiphenyl isomers.

* * * * *